L. E. WATERMAN.
PLANTER.
APPLICATION FILED JAN. 10, 1914.
1,186,632.
Patented June 13, 1916.
2 SHEETS—SHEET 1.
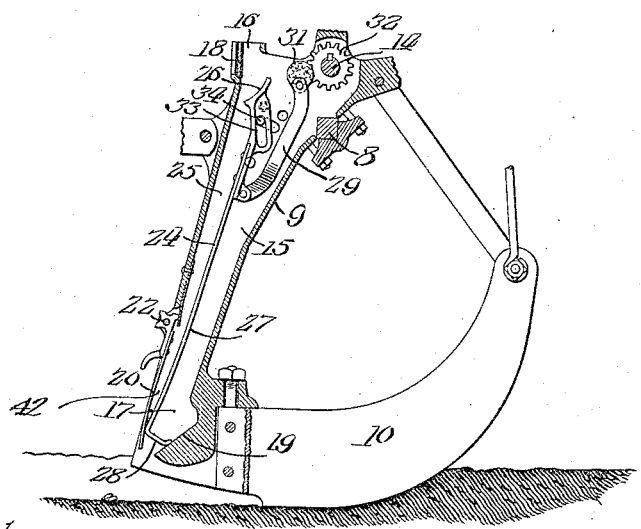
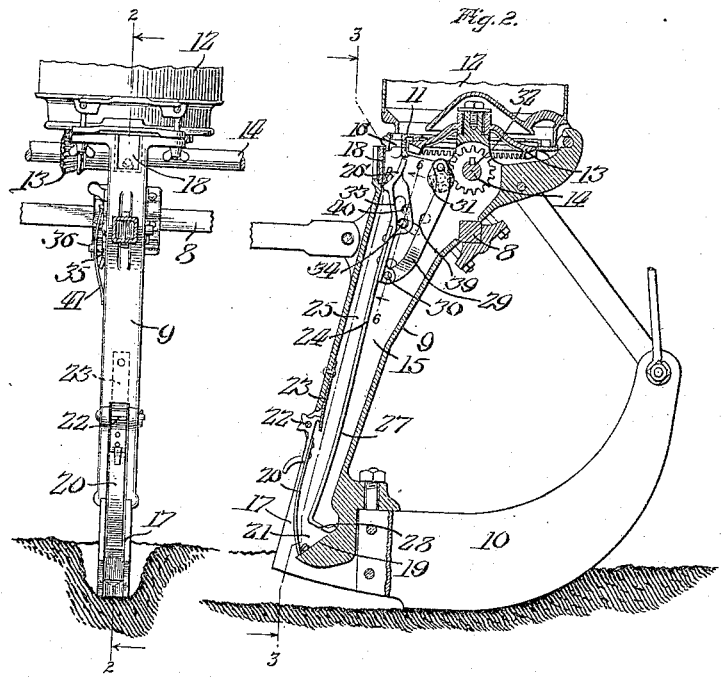
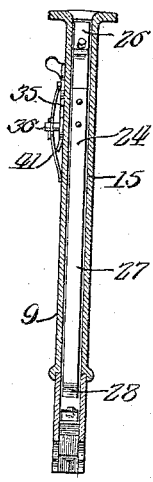
Witnesses:
Inventor:
Lewis E. Waterman
By A. O. Behel
Atty.

L. E. WATERMAN.
PLANTER.
APPLICATION FILED JAN. 10, 1914.
1,186,632.
Patented June 13, 1916.
2 SHEETS—SHEET 2.
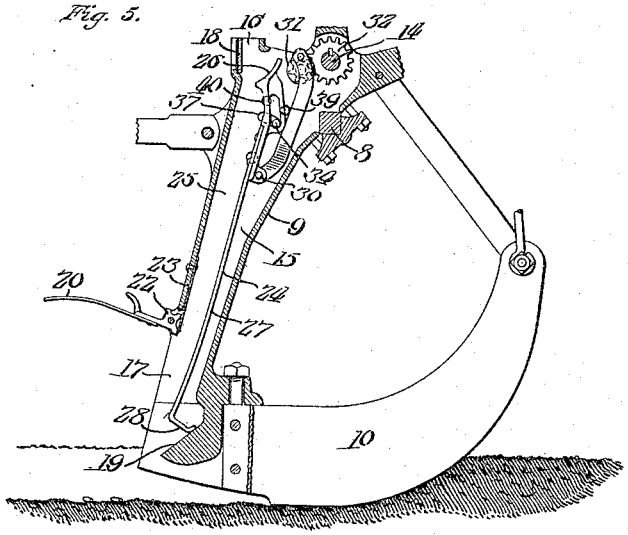
Fig. 5.
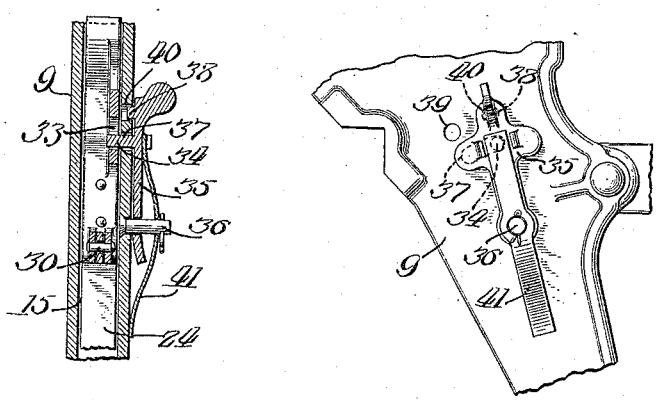
Fig. 6.
Fig. 7.
Witnesses:
W. L. Dow.
John F. McKenna, Jr.
Inventor:
Lewis E. Waterman
By A. O. Behel
Atty.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

PLANTER.

1,186,632.  Specification of Letters Patent.  Patented June 13, 1916.

Application filed January 10, 1914. Serial No. 811,374.

*To all whom it may concern:*

Be it known that I, LEWIS E. WATERMAN, a citizen of the United States, residing at Rockford, in the county of Winnebago and the State of Illinois, have invented certain new and useful Improvements in Planters, of which the following is a specification.

This invention relates to planters, more particularly to corn-planters and to the seed discharge-valve mechanism thereof.

One of the primary objects of my invention is the provision of seed discharge-valve mechanism of improved construction for handling seed after the same has passed from the hopper, the aim being to secure efficient and effective service therefrom through a novel construction whose simple design materially reduces the cost of manufacture and renders the operation of the mechanism simple and easy, and to accomplish such improvement primarily through the provision of a three gate valve structure embodying a unitary member for effecting or actuating all of the valves.

A further object is to provide a seed sight operable in novel manner by the discharge valve mechanism.

In the accompanying drawings: Figure 1 is a back view in elevation of the seed discharge mechanism of a corn-planter embodying my improvements. Fig. 2 is a vertical sectional view through the planter as taken on the line 2—2 of Fig. 1, the operable parts in a position with the first seed gate closed. Fig. 3 is a vertical sectional view through the discharge-chute, taken on the line 3—3 of Fig. 2. Fig. 4 is a sectional view similar to Fig. 2, the second gate being closed. Fig. 5 is a sectional view similar to Fig. 2, but with the valve parts moved to a position for drilling, as distinguished from hill planting. Fig. 6 is an enlarged detail sectional view taken on the line 6—6 of Fig. 2. Fig. 7 is a side view of the mechanism shown in Fig. 6.

In corn-planter seed delivery mechanism having means for accurately feeding a desired number of kernels at a determined rate, the means most generally employed for accomplishing this function is that of a rotary seed-plate associated with a hopper and actuated by a check-row mechanism; and the seeds having been fed from the hopper through the seed-plate, pass through valve mechanism which drops them into the furrow. Valve mechanism for so discharging the seed and such as is commonly used in different forms have been composed of more or less intricate operating parts which render them expensive to manufacture and require much diligence in maintaining them in working order.

In my improvements I have obviated complexity of the valve mechanism, and have given to it a further function—by providing the desideratum of a sight feed—of forming a stoppage of the seed passage at said sight.

In the drawings I have illustrated only so much of a corn-planter as is necessary to give a clear and accurate description of the discharge of the seeds; and with this consideration, a frame member 8 supports a vertically disposed boot or discharge-chute 9 which carries at the forward end thereof a runner 10 for forming a furrow, and at its upper end a rotary seed-plate 11 which is associated with a hopper 12 mounted on the boot, the seed-plate being rotated through the medium of gears 13 on the drive-shaft 14.

The discharge chute 9 forms a conduit 15 which is inclined downwardly and rearwardly and has an entrance 16 at its upper end through which seeds are dropped from the seed-plate, and a discharge opening 17 at its lower end. A sight 18 is located at the entrance to the chute, whereby the operator on the planter can see during the operation of planting whether seed is being discharged so that he can stop operation when the seed-plate mechanism is not dropping seed as it should or when the hopper has been emptied. The lower and forward side of the conduit is formed with an inclined face 19, which together with the spring closure or valve 20 forms a pocket 21. The face 19 is inclined downwardly and rearwardly as is the main discharge conduit, but at a more pronounced angle than that of said conduit, for the purpose hereinafter mentioned. The spring closure 20 is carried by a bracket 22 pivotally mounted on the chute, and a flat spring 23 exerts a pressure on said bracket to hold the free end of the spring closure yieldingly in contact with face 19. A valve member or plunger 24 is located in the conduit 15, extending longitudinally substantially the length thereof forming a wall partitioning said conduit to form a seed passage 25 and partitioning said conduit to form a seed passage 25. The valve member or plunger includes a top pocket portion which is adapted to be moved into relation with the sight 18 and entrance 16 to form a pocket in which seed dropped through said entrance is checked and is discernible from without through the sight, and a spring body portion 27 which has a forwardly bent end 28 resting in engagement with the face 19. The said valve member is reciprocable lengthwise in the chute through means of a pitman 29 which is pivoted at one end to the valve member intermediate the ends thereof at 30, and at its opposite end to the crank member 31 which is in gear connection with gear 32 fixed to shaft 14. During reciprocatory movement of the valve member its end 28 is held yieldingly in contact with face 19 and its pocket end 26 is movable in a back and forward movement through the medium of a cam-slot 33 in the said pocket end and a stud 34 located in the cam-slot. The stud 34 is carried by an arm 35 located on the outer side of the chute casing and pivoted at 36 thereto, the stud extending through a slot 37 in said casing, and the slot being horizontally extended in the line of an arc struck from the said pivot 36. The arm 35 is movable to two set positions through pivotal movement these positions being determined by the lug 38 of the arm 35 engaging in either of holes 39 or 40 which are formed in the chute above the ends of the slot 37, the arm being maintained yieldingly pressed against the side of the chute casing and movable away therefrom to withdraw lug 38 to shift the arm, by a flat spring 41. This adjustment of the arm 35—through its stud 34 engagement in the cam-slot 33—renders the valve member operative and inoperative, as for hill planting and drilling, respectively.

During operation of the planter the runner 10 is lowered into the ground to form a furrow (as illustrated in the drawings) and the shaft 14 is rotated at intervals by mechanism actuated by a check row wire or by any suitable means to rotate the seed-plate and operate the discharge valve member, synchronously. For planting in hills the arm 35 would be set with its lug 38 in hole 40, thus maintaining the valve member in operative position such as is shown in Figs. 2 and 4. As the valve member is reciprocated by the pitman 29 its lower end 28 will be maintained yieldingly in contact with the face 19 because of support of the upper end of the valve member tensionally holding the spring end 27 so in contact, and the upper pocket end 26 of the valve member, in its said reciprocation, will move toward and away from the sight of the passage 15 by being guided by the cam-slot 33 moving along the fixed stud 34, this movement alternately closing and opening the upper end of passage 15. This movement of the pocket end of the valve member is an oscillatory one, and combining the reciprocatory movement therewith a movement is resultant whereby upon the up stroke of the valve member the end 26 is moved into a pocket position (shown in Fig. 2) to receive corn from the entrance 16 and hold it against the glass sight 18 and in view of the operator. Since the crank of the pitman travels in its upper cycle when the valve member is in this raised position, the pocket formed at the sight will be maintained for an interval by the valve member being practically stationary, thus holding the corn plainly in view, this pocket check forming the first valve gate of which the member 24 effects the operation.

Upon the down stroke of the pitman and during movement of the valve member, the pocket end thereof will be swung away from the sight side of the chute casing, thus allowing the corn located in said sight pocket to drop through passage 25 until it reaches a pocket 42 (Fig. 4) formed by the lower end of the valve member being moved in its down stroke by the face 19 rearwardly with respect to the main seed conduit into contact with the spring closure 20, moving the same from its contact with the face 19; thus the valve member effects a second gate in the discharge passage of the corn. During the succeeding up stroke of the valve member the lower end thereof will be drawn away from the spring closure guided by the face 19, allowing said closure to assume its normal closing position, and as said end of the valve member is withdrawn, the corn in pocket 42 will drop into the pocket 21. By this upward movement the valve member will form the sight pocket to receive corn for the succeeding hill, such movement being above described. In the following down stroke of the valve member the angle corner of the lower end thereof will contact the closure 20 and move it from the face 19, and as this downward movement is a quick action the end 28 will discharge the corn from pocket 21 by a push movement downwardly and rearwardly, thus causing the corn to strike the ground in correct relation with the actuating check on the check-row wire whether the team is traveling fast or slow. In the operation of the closure 20 to form a pocket at 21 a third gate to the discharge valve structure is added to those operable by the valve member 24.

When drilling is desired the spring closure 20 would be swung upon its pivot 22 to a raised opened position to give a permanent opening to the discharge end of the conduit, and the arm 35 would be adjusted with its lug 38 in hole 39, thus moving the valve member away from the back wall of the conduit (as seen in Fig. 5) causing the valve member to reciprocate in a range of oscillatory movement which does not obstruct drop of corn through the passage 25.

It will be observed that should it be desired to operate the planter for hill planting without checking seed at the sight 18, the spring closure 20 may be lowered to operative position and the plunger operated in its adjusted position shown in Fig. 5, it being obvious that the timing of the dropping of seed by the seed-dropping mechanism, that is, the seed plate would be changed accordingly.

I claim as my invention:

1. In a planter, the combination with a vertically extending seed chute having an entrance at its upper end, and a discharge opening at its lower end, of a seed sight in the chute adjacent to the entrance end thereof, a spring-pressed closure covering said discharge opening, a single, integrally constructed plunger disposed within the seed chute and having a portion coöperable with the seed sight portion of the chute for forming a seed-pocket thereat and having a portion coöperable with the closure for actuating the same and forming therewith a second seed-pocket, and means for reciprocating said plunger whereby to form said seed-pocket at the seed sight and closure and to discharge seed from the chute by opening said closure.

2. In a planter, the combination with a seed chute having a seed entrance at its upper end and a seed discharge opening at its lower end, of a spring-pressed closure covering said discharge opening, a plunger mounted to reciprocate in and longitudinally of the seed chute and shaped at its upper end to form with a wall of the chute an initial seed-pocket adjacent to the entrance of the chute and at its lower end to engage and move said closure to an open position, and means for reciprocating and so guiding the plunger as to form said initial seed-pocket upon movement of the plunger to its upper position and to open the closure by the down stroke of the plunger and simultaneously form with the closure a second seed-pocket.

3. In a planter, the combination with a seed discharge-conduit having a seed-sight at its upper end and a movable closure at its lower end, of an integrally constructed valve member having a pocket portion movable into a pocket position at said sight and having a portion engageable with said closure for operating the same, and means for imparting reciprocatory movement to the valve member for alternately forming said sight pocket and operating said closure.

4. In a planter, the combination with a seed-discharge conduit, of a single plunger mounted to reciprocate therein and shaped to form with the wall of the conduit, two seed-pockets at spaced points in the length of the conduit by reciprocation of the plunger, means for reciprocating the plunger, and means for causing the plunger to form only one of said seed pockets when reciprocated.

5. In a planter, the combination with a seed-discharge conduit, of a plunger mounted to reciprocate therein and being coöperable with conduit-associated portions for forming two seed-pockets at spaced points in the length of the conduit, means for reciprocating the plunger, and means for adjusting the plunger whereby to form only one seed-pocket as the plunger is reciprocated.

6. In a planter, the combination with a seed discharge-conduit having a sight adjacent to its upper end and a movable closure at its lower end, of a valve member located in the conduit having its upper end adapted to form a seed-gate at said sight and its lower end to actuate said closure, means for reciprocating the valve member, and means for guiding the said upper end thereof to form said gate during the reciprocation of the valve member.

7. In a planter, the combination with a seed discharge-conduit having a sight adjacent to its upper end and a movable closure at its lower end, of a valve member located in the conduit, having its upper end adapted to form a seed-gate at said sight and its lower end to actuate said closure, a cam-face for guiding said lower end to operate said closure, a cam-face for guiding the upper end to form said gate, and means for reciprocating the valve member to cause its ends to be guided by said cam-faces.

8. In a planter, a seed conduit, a seed-sight in said conduit, a member movable into and out of the seed passage through the conduit, being adapted to check seed passage at said sight when moved into said passage and to allow free passage of seed when retracted, a rotatable member, a crank member connected thereto, and a connection between said crank member and the member movable into and out of said passage for effecting the said operation of the movable member.

9. In a planter, the combination of a seed-discharge conduit having a discharge opening at its lower end, a valve gate pivotally mounted to swing into a position to close said discharge opening, the pivoted end of the gate having relatively angular portions, and spring means engaging one of said angular portions for holding the gate yieldingly closed, the gate being movable to an inoperative open position and held therein by the spring engaging another of said angular portions.

10. In a planter, the combination with a seed chute, of a plunger mounted to reciprocate therein and arranged to effect by reciprocation two seed-pockets at spaced points in the length of the chute, means for reciprocating the plunger, and means for causing the plunger to operate in a path such that only one of the seed pockets will be effected by said reciprocation.

11. In a planter, the combination with a seed chute having a seed discharge opening at its lower end, of a movable closure covering said opening, a seed sight in the chute above said discharge opening, an integrally constructed plunger mounted to reciprocate lengthwise in the chute whereby to actuate said movable closure to open and closed positions and having a pocket portion adapted to be brought into and out of seed-checking position at said seed sight as the plunger is reciprocated, and means for reciprocating the plunger.

12. In a planter, the combination with a seed chute having an entrance at its upper end and a discharge at its lower end, of means for discharging seed into the seed entrance end of the seed chute, mechanism for operating said seed-discharging means, a crank-member adapted to be rotated by said mechanism, a seed-sight in the chute adjacent to the seed entrance thereof, a movable closure covering the said discharge opening, a plunger in the chute connected to said crank-member and arranged to actuate said closure as the plunger is reciprocated through rotation of the crank member, and means movable into and out of the path of seeds discharged from seed-dropping means for checking seed at the seed sight, said seed-checking means being actuated by the plunger as the same is reciprocated.

In testimony whereof I have hereunto set my hand in presence of two subscribing witnesses.

LEWIS E. WATERMAN.

Witnesses:
E. D. E. N. BEHEL,
JOHN F. McCANNA, Jr.

Copies of this patent may be obtained for five cents each, by addressing the "Commissioner of Patents, Washington, D. C."